United States Patent
Song et al.

(10) Patent No.: US 11,157,358 B2
(45) Date of Patent: Oct. 26, 2021

(54) MEMORY MODULE, ERROR CORRECTION METHOD OF MEMORY CONTROLLER CONTROLLING THE SAME, AND COMPUTING SYSTEM INCLUDING THE SAME

(71) Applicant: SAMSUNG ELECTRONICS CO., LTD., Suwon-si (KR)

(72) Inventors: Wonhyung Song, Suwon-si (KR); Taekwoon Kim, Suwon-si (KR); Hosung Yoon, Suwon-si (KR); Yoojung Lee, Suwon-si (KR); Jangseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/861,312

(22) Filed: Apr. 29, 2020

(65) Prior Publication Data
US 2021/0089395 A1   Mar. 25, 2021

(30) Foreign Application Priority Data
Sep. 20, 2019   (KR) .......................... 10-2019-0116041

(51) Int. Cl.
| | | |
|---|---|---|
| *G06F 11/10* | (2006.01) | |
| *G06F 11/16* | (2006.01) | |
| *G06F 11/07* | (2006.01) | |
| *G06F 1/08* | (2006.01) | |

(52) U.S. Cl.
CPC ............ *G06F 11/1068* (2013.01); *G06F 1/08* (2013.01); *G06F 11/076* (2013.01); *G06F 11/1016* (2013.01); *G06F 11/1044* (2013.01); *G06F 11/1679* (2013.01)

(58) Field of Classification Search
CPC ...... G06F 11/1068; G06F 1/08; G06F 11/076; G06F 11/1016; G06F 11/1044; G06F 11/1679
See application file for complete search history.

(56) References Cited

U.S. PATENT DOCUMENTS

| | | | |
|---|---|---|---|
| 5,996,096 A | * | 11/1999 | Dell ....................... G11C 29/88 714/710 |
| 6,372,608 B1 | | 4/2002 | Shimoda et al. |
| 6,645,830 B2 | | 11/2003 | Shimoda et al. |
| RE38,466 E | | 3/2004 | Inoue et al. |
| 6,818,465 B2 | | 11/2004 | Biwa et al. |
| 6,818,530 B2 | | 11/2004 | Shimoda et al. |
| 6,858,081 B2 | | 2/2005 | Biwa et al. |
| 6,967,353 B2 | | 11/2005 | Suzuki et al. |
| 7,002,182 B2 | | 2/2006 | Okuyama et al. |

(Continued)

*Primary Examiner* — Kyle Vallecillo
(74) *Attorney, Agent, or Firm* — F. Chau & Associates, LLC

(57) ABSTRACT

A memory module includes first memory chips, each having a first input/output width, and configured to store data, a second memory chip having a second input/output width and configured to store an error correction code for correcting an error in the data, and a driver circuit configured to receive a clock signal, a command, and an address from a memory controller and to transmit the clock signal, the command, and the address to the first memory chips and the second memory chip. An address depth of each of the first memory chips and an address depth of the second memory chip are different from each other.

19 Claims, 18 Drawing Sheets

(56) References Cited

U.S. PATENT DOCUMENTS

| | | |
|---|---|---|
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong et al. |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 8,874,979 B2 | 10/2014 | Cordero et al. |
| 9,772,900 B2 | 9/2017 | Hu et al. |
| 9,983,990 B1* | 5/2018 | Hutton ................ G06F 12/0284 |
| 10,324,841 B2* | 6/2019 | Lee ..................... G06F 12/0802 |
| 2006/0267172 A1* | 11/2006 | Nguyen ................... G11C 5/04 |
| | | 257/681 |
| 2010/0003837 A1* | 1/2010 | Loughner ................ G11C 5/04 |
| | | 439/64 |
| 2010/0005219 A1* | 1/2010 | Loughner ................ G11C 7/02 |
| | | 711/5 |
| 2010/0005220 A1* | 1/2010 | Loughner ............. G06F 13/426 |
| | | 711/5 |
| 2010/0235562 A1 | 9/2010 | Gaither et al. |
| 2012/0155173 A1* | 6/2012 | Lee ........................ G11C 16/26 |
| | | 365/185.09 |
| 2013/0107872 A1 | 5/2013 | Lovett et al. |
| 2013/0301207 A1* | 11/2013 | Chun ...................... H05K 1/117 |
| | | 361/679.32 |
| 2014/0019588 A1 | 1/2014 | Packman et al. |
| 2014/0108709 A1 | 4/2014 | Barrall et al. |
| 2014/0268973 A1* | 9/2014 | Connolly ........... G11C 11/4093 |
| | | 365/63 |
| 2016/0239460 A1 | 8/2016 | Ziakas et al. |
| 2016/0342539 A1 | 11/2016 | Bains |
| 2017/0060681 A1 | 3/2017 | Halbert et al. |
| 2017/0063992 A1 | 3/2017 | Baek et al. |
| 2018/0019006 A1 | 1/2018 | Brandl et al. |
| 2018/0101424 A1* | 4/2018 | Lim ....................... G11C 29/42 |
| 2018/0210787 A1 | 7/2018 | Bains et al. |
| 2018/0218762 A1 | 8/2018 | Matsui |
| 2018/0254079 A1 | 9/2018 | Cox et al. |
| 2019/0379380 A1* | 12/2019 | Atsatt .............. H03K 19/17728 |
| 2021/0011878 A1* | 1/2021 | Teh ........................... G06F 1/06 |

\* cited by examiner

FIG. 5B

| Configuration | | 4 Gb x4 | 2 Gb x8 | 1 Gb x8 |
|---|---|---|---|---|
| Bank Address | BG Address | BG0~BG2 | BG0~BG2 | BG0~BG1 |
| | Bank Address in a BG | BA0~BA1 | BA0~BA1 | BA0~BA1 |
| | #BG/ #Banks per BG/ # Banks | 8 / 4 / 32 | 8 / 4 / 32 | 4 / 4 / 16 |
| Row Address | | R0~R15 | R0~R15 | R0~R15 |
| Column Address | | C0~C10 | C0~C9 | C0~C9 |
| Page size | | 1KB | 1KB | 2KB |
| Chip IDS / Maximum Stack Height | | CID0~3 / 16H | CID0~3 / 16H | CID0~3 / 16H |

MEMORY MODULE, ERROR CORRECTION METHOD OF MEMORY CONTROLLER CONTROLLING THE SAME, AND COMPUTING SYSTEM INCLUDING THE SAME

CROSS-REFERENCE TO RELATED APPLICATION(S)

This U.S. non-provisional patent application claims benefit of priority under 35 USC 119(a) to Korean Patent Application No. 10-2019-0116041 filed on Sep. 20, 2019 in the Korean Intellectual Property Office, the disclosure of which is incorporated by reference in its entirety herein.

BACKGROUND

1. Technical Field

The present disclosure relates to a memory module, an error correction method of a memory controller controlling the memory module, and a computing system including the memory module.

2. Discussion of Related Art

Data may be stored in a memory of a memory system along with an error correction code (ECC). If the data later develops one or more errors, the corresponding ECC can be used to potentially correct the errors. Examples of the ECC include block codes and convolution codes.

A memory controller or other logic of the memory system may perform error detection on the data and correction of the data using one or more ECCs. The logic being located within a die may be referred to as an on-die ECC circuit. Common memory architectures for the on-die ECC circuit include a 4-bit wide interface (i.e., x4 interface), an 8-bit wide interface (i.e., x8 interface), or a 16-bit wide interface (i.e., x16 interface). The design and number of required ECC bits for implementing ECC are mainly dictated by the memory architecture.

SUMMARY

Exemplary embodiments of the inventive concept provide a memory module configured to improve error correction ability while preventing deteriorations in performance, an error correction method of a memory controller configured to control the memory module, and a computing system including the memory module.

According to an exemplary embodiment of the inventive concept, a memory module includes first memory chips, each having a first input/output width, and configured to store data, a second memory chip having a second input/output width and configured to store an error correction code for correcting an error in the data, and a driver circuit configured to receive a clock signal, a command, and an address from a memory controller and to transmit the clock signal, the command, and the address to the first memory chips and the second memory chip. An address depth of each of the first memory chips and an address depth of the second memory chip are different from each other.

According to an exemplary embodiment of the inventive concept, a memory module includes a first sub-channel, a second sub-channel, and a driver circuit configured to receive a clock signal, first and second commands, and an address from a memory controller and to transmit the clock signal, the first command, and the address to the first sub-channel and transmit the clock, the second command, and the address to the second sub-channel. Each of the first and second sub-channels includes first memory chips, each having a first input/output width and configured to store data, and a second memory chip having a second input/output width, less than the first input/output width, and configured to store an error correction code for correcting an error in the data. An address depth of each of the first memory chips and an address depth of the second memory chip are different from each other.

According to an exemplary embodiment of the inventive concept, an error correction method of a memory controller is provided. The memory controller is configured to control a memory module including first memory chips, each having a first input/output width, and configured to store data and at least one second memory chip having a second input/output width and configured to store an error correction code for correcting an error in the data. The error correction method includes: determining whether the data, received from the memory module, includes an error that is correctable; determining whether physical replacement of a memory cell storing the data is required; selecting a first error correction mode when the error is correctable and the physical replacement is required; selecting a second error correction mode when the error is correctable and the physical replacement is not required; and performing an error correction operation on the data according to the selected mode.

According to an exemplary embodiment of the inventive concept, a computing system is provided that includes at least one memory module, at least one nonvolatile memory module, and at least one processor configured to control the at least one memory module and the at least one nonvolatile memory module. The at least one memory module includes at least one first memory chip, having a first input/output width and configured to store data, and at least one second memory chip having a second input/output width, different from the first input/output width, and configured to store an error correction code for correcting an error in the data.

BRIEF DESCRIPTION OF DRAWINGS

Exemplary embodiments of the present disclosure will be more clearly understood from the following detailed description, taken in conjunction with the accompanying drawings, in which:

FIG. 5B illustrates an addressing table of a memory chip housing the memory module 100 according to an exemplary embodiment of the inventive concept;

DETAILED DESCRIPTION OF THE EXEMPLARY EMBODIMENTS

Hereinafter, exemplary embodiments of the inventive concept will be described with reference to the accompanying drawings.

A memory system according to an exemplary embodiment of the inventive concept includes a memory module including a first memory chip and a second memory chip having input and output widths that differ from each other. The first memory chip and the second memory chip may have separate address controls to extend an error correction code (ECC) range without causing deteriorations in performance.

Figure 1:
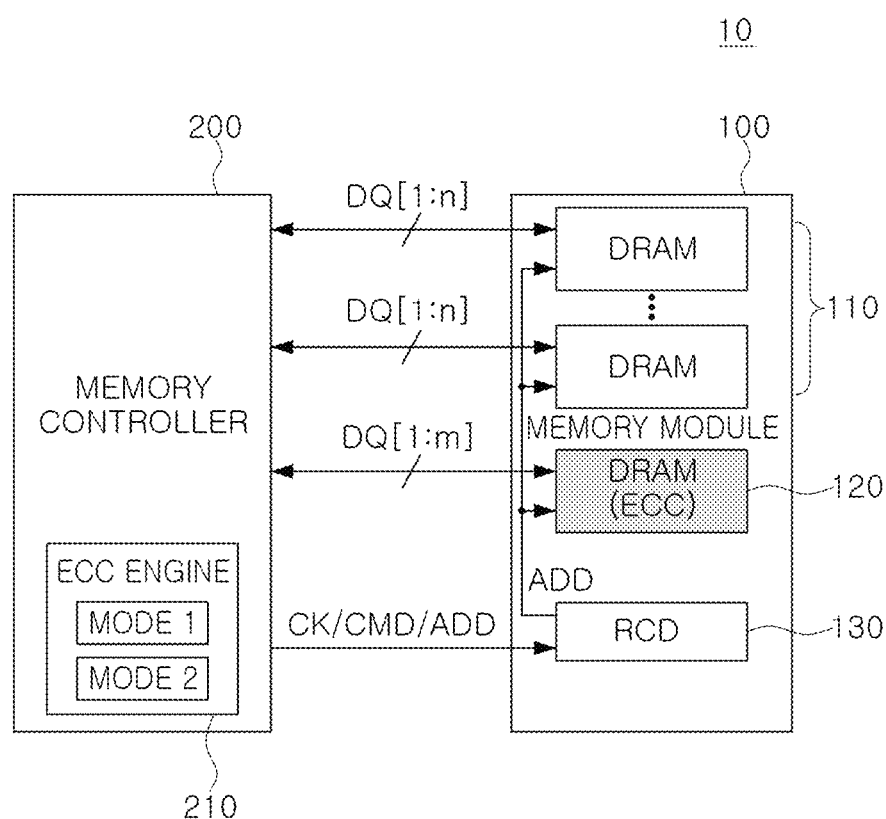
FIG. 1 illustrates a memory system 10 according to an exemplary embodiment of the inventive concept.

FIG. 1 illustrates a memory system 10 according to an exemplary embodiment of the inventive concept. Referring to FIG. 1, the memory system 10 may include a memory module 100 and a memory controller 200.

The memory module 100 may temporarily store data processed or to be processed by a processor. The memory module 100 may be used as an operating memory, a working memory, or a buffer memory in a computing system. The memory module 100 includes first memory chips 110, at least one second memory chip 120, and a registered clock driver (RCD) 130 (e.g., a driving circuit).

In an exemplary embodiment, the memory module 100 may be implemented as a single in-line memory module (SIMM), a dual in-line memory module (DIMM), a small-outline DIMM (SODIMM), an unbuffered DIMM (UDIMM), a Fully-Buffered DIMM (FBDIMM), a Rank-Buffered DIMM (RBDIMM), a mini-DIMM, a micro-DIMM, a Registered DIMM (RDIMM), or a Load-Reduced DIMM (RDIMM).

Each of the first memory chips 110 may be implemented to store data transmitted from the memory controller 200. In exemplary embodiment, each of the first memory chips 110 may be a volatile memory such as a dynamic random access memory (DRAM), a synchronous DRAM (SDRAM), a double data rate SDRAM (DDR SDRAM), a low power double data rate SDRAM (LPDDR SDRAM), a graphics double data rate SDRAM (GDDR SDRAM), a Rambus DRAM (RDRAM), or a static RAM (SRAM). In another embodiment, each of the first memory chips 110 may be a nonvolatile memory such as a phase-change RAM (PRAM), a magneto-resistive RAM (MRAM), a resistive RAM (ReRAM), a ferroelectric RAM (FRAM), or a flash memory. In an exemplary embodiment, each of the first memory chips 110 may be implemented as a DRAM chip according to various standards such as Double Data Rate (DDR), DDR2, DDR3, DDR4, and DDR5. In an exemplary embodiment, each of the first memory chips 110 is implemented to input and output data through n data channels DQ [1:n], where n is a positive integer greater than or equal to 2.

The second memory chip 120 may be implemented to store parity (e.g., parity data) for correcting an error of data stored in the first memory chips 110. In an exemplary embodiment, the second memory chip 120 may be a volatile memory such as DRAM, SDRAM, DDR SDRAM, LPDDR SDRAM, GDDR SDRAM, RDRAM, or SRAM. In another exemplary embodiment, the second memory chip 120 may be a nonvolatile memory such as PRAM, MRAM, ReRAM, FRAM, or flash memory. In an exemplary embodiment, the second memory chip 120 may be implemented as a DRAM chip according to various standards such as DDR, DDR2, DDR3, DDR4, and DDR5. In an exemplary embodiment, the second memory chip 120 is implemented to input and output data through m data channels DQ [1: m], where m is a positive integer less than n.

In an exemplary embodiment, a storage capacity of each of the first memory chips 110 and a storage capacity of the second memory chip 120 are equal to each other.

The registered clock driver (RDC) 130 may be implemented to receive a command CMD, an address ADD, and a clock signal CK from the memory controller 200. The RCD 130 may transmit the received command CMD, the received address ADD, and the received clock signal CK to the first memory chips 110 and the second memory chip 120.

Although not illustrated in FIG. 1, the memory module 100 may further include a serial presence detect (SPD) chip. The SPD chip may be implemented to store information on characteristics of the memory module 100. In an exemplary embodiment, the SPD chip may store memory module information such as a module type, an operating environment, a line arrangement, a module configuration, and a storage capacity of the memory module 100. In an exemplary embodiment, the SPD chip may include a programmable read-only memory such as an electrically erasable programmable read-only memory (EEPROM).

The memory controller 200 may be implemented to transmit and receive a command/address CMD/ADD, a clock signal CK, a control signal, data DQ, and a data strobe signal DQS to and from the memory module 100 through a channel. In an exemplary embodiment, the memory controller 200 controls reading of the data DQ from the memory module 100 and writing of the data DQ into the memory module 100. In an exemplary embodiment, the memory controller 200 provides the command/address CMD/ADD and the control signal to the memory module 100, and may control transmitting and receiving of the data DQ to and from a memory chip to be accessed, among the memory chips, based on the control signal in a writing or reading operation corresponding to the command/address CMD/ADD. For example, the writing operation may performed in response to a CMD of a writing command and the reading operation may be performed in response to a CMD of a reading command.

In an exemplary embodiment, the memory controller 200 is connected to an external host such as a processor. For example, the memory controller 200 may communicate with the external host through at least one of various interface protocols such as Universal Serial Bus (USB), MultiMedia- Card (MMC), Parallel Connection Interface (PCI), Parallel Connection Interface Express (PCIe), Advanced Technology Attachment (ATA), Serial-ATA, Parallel-ATA, Small Computer System Interface (SCSI), Serial Attached SCSI (SAS), Enhanced Small Device Interface (ESDI), or Integrated Drive Electronics (IDE).

In an exemplary embodiment, the memory controller 200 may be configured as an additional chip or may be integrated with the memory module 100. For example, the memory controller 200 may be implemented on a motherboard and may be implemented as an integrated memory controller (IMC) included in a microprocessor. In addition, the memory controller 200 may be disposed in an input/output hub, and the input/output hub including the memory controller 200 may be referred to as a memory controller hub (MCH).

The memory controller 200 includes an ECC engine 210 (e.g., a circuit) to perform error detection and correction operations.

The ECC engine 210 may use at least one of a Parity-Check, Cyclical Redundancy Code Check (CRC Check), Checksum Check, and Hamming Code to detect errors and correct the detected errors. In an exemplary embodiment, the ECC engine 210 may use a correction scheme such as x4 Single Device Data Correction (SDDC), x8 Single-bit Error Correction and Double-bit Error Detection (SECDED), or Lockstep x8 SDDC to correct errors of a plurality of memory chips.

In an exemplary embodiment, the ECC engine 210 operates in one of a first error correction mode and a second error correction mode. The first error correction mode is a soft error correction mode, and the second error correction mode is a hard error correction mode. In the soft error correction mode, data of the first memory chips 110 is corrected using m parities of the second memory chip 120. In the hard error correction mode, data of the first memory chips 110 is corrected using 2 m parities of the second memory chip 120.

In an exemplary embodiment, the ECC engine 210 determines whether error correction is possible for data of the first memory chips 110 in the first error correction mode, and performs a soft error correction operation when the error correction is determined to be possible (e.g., when an error is determined to be correctable). In an exemplary embodiment, the ECC engine 210 performs a hard error correction operation on the data of the first memory chips 110 in the second error correction mode when an error is correctable but physical replacement (redundancy cell replacement) is required. For example, if the data is stored in an original memory cell that has been determined to be unreliable, after the data is corrected, it can be stored in the redundancy cell. In an exemplary embodiment, a mapping table that maps a logical address to a physical address of the original memory cell is updated to map the logical address to a physical address of the redundancy memory cell.

In an exemplary embodiment, the ECC engine 210 reads a parity from the second memory chip 120 depending on an error correction mode selected using at least one address of an ECC-only second memory chip 120. The at least one address may be a row address, a column address, a bank address, or a bank group address.

A common memory system includes memory chips, having the same input and output width, to operate within an ECC error correction range limited by a memory module. On the other hand, the memory system 10 according to an exemplary embodiment of the inventive concept separates address controls of the first memory chips 110 and the second memory chip 120 in a memory module, in which the first memory chips 120 storing data and the second memory chip 120 storing a parity of the data are configured to have different input/output widths from each other, to extend an ECC error correction range width depending on a predetermined scheme.

Figure 2A:
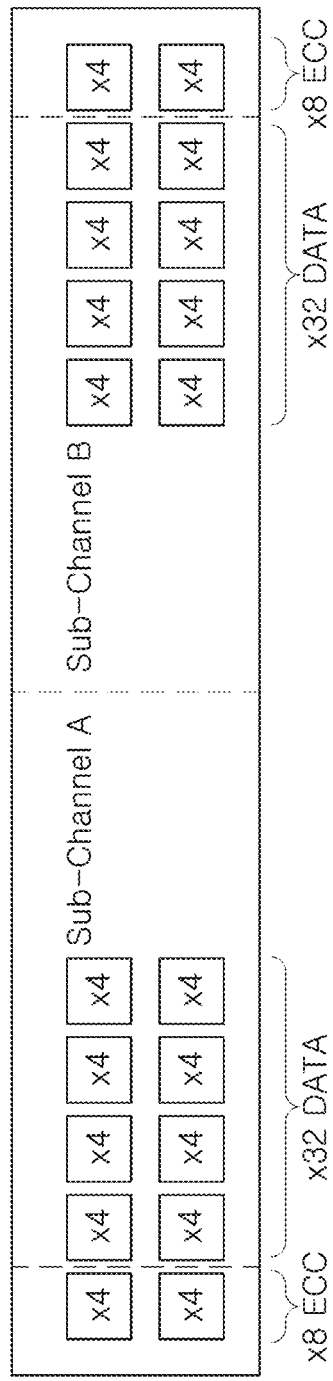
FIGS. 2A and 2B illustrate common memory modules, each including memory chips having the same input/output width.
Figure 2B:
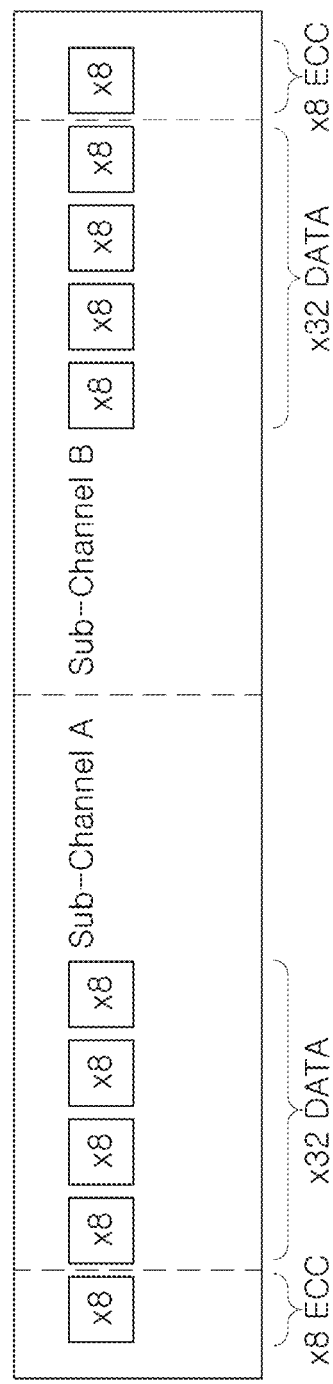

FIGS. 2A and 2B illustrate common memory modules, each including memory chips having the same input/output width. Referring to FIGS. 2A and 2B, each of sub-channels A and B may input and output x8 ECC and x32 DATA (codeword). A configuration of codeword x8 ECC and x32 DATA, illustrated in FIG. 2A, is implemented by x4 memory chips having the same input/output width. The memory module includes two x4 memory chips for x8 ECC and eight x4 memory chips for x32 DATA. Configurations of the x8 ECC and x32 DATA, illustrated in FIG. 2B, are implemented by x8 memory chips having the same input/output width. The memory module includes one x8 memory chip for x8 ECC and four x8 memory chips for x32 DATA.

The memory module, illustrated in FIG. 2A, may perform a maximum of x4 data lane correction per sub-channel. The memory module, illustrated in FIG. 2B, may simultaneously operate two ranks during correction of an x8 data lane to cause deteriorations in performance resulting from burst chopping (lockstep). For example, when mainstream DRAM density is increased to 16 Gb in a DDR5 RAM, an 8 Gb configuration may cause degradation in performance because the number of banks is decreased by half. The x4 and x8-based DIMMs, each having a basic capacity of 16 G, may make it difficult to configure a low capacity such as 8 Gb or 16 Gb. The x4 DIMM has a minimum capacity of 32 Gb, and the x8 DIMM has a minimum capacity of 16 Gb. Accordingly, a single rank may be used in configuring a minimum capacity. For this reason, rank interleave may not be possible, and thus, degradation in performance may occur.

Figure 3:
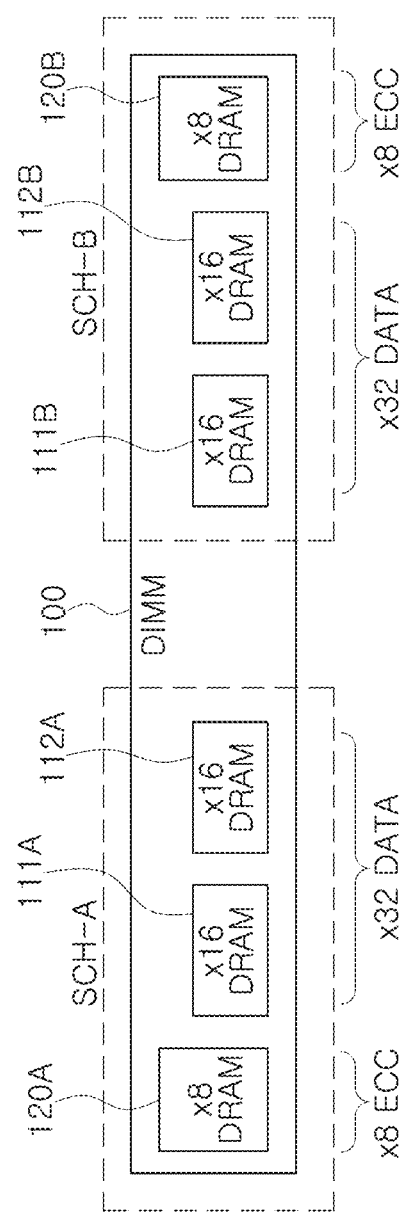
FIG. 3 illustrates a memory module 100 according to an exemplary embodiment of the inventive concept.

FIG. 3 illustrates a memory module 100 according to an exemplary embodiment of the inventive concept. Referring to FIG. 3, the memory module (DIMM) 100 is implemented to respectively input and output x8 ECC and x32 DATA to two sub-channels SCH-A and SCH-B using memory chips such as an x8 DRAM and an x16 DRAM having different input/output widths from each other.

The first sub-channel SCH-A includes two first memory chips 111A and 112A and one second memory chip 120A.

Each of the first memory chips 111A and 112A may be implemented to store data. In an exemplary embodiment, each of the first memory chips 111A and 112A is implemented to have a first input/output width of x16. In an exemplary embodiment, the second memory chip 120A is implemented to have a second input/output width of x8. The second input/output width of x8 is half of the first input/output width x16. However, it is to be understood that the second input/output width is not limited thereto. For example, in response to each clock pulse of the clock signal CK, the first memory chip 111A can output 16 bits while the second memory chip 120A outputs 8 bits.

In an exemplary embodiment, each of the first memory chips 111A and 112A and the second memory chip 120A have the same storage capacity.

The second sub-channel SCH-B includes two first memory chips 111B and 112B and one second memory chip 120B. The second sub-channel SCH-B may have the same configuration as the first sub-channel SCH-A.

Figure 4:
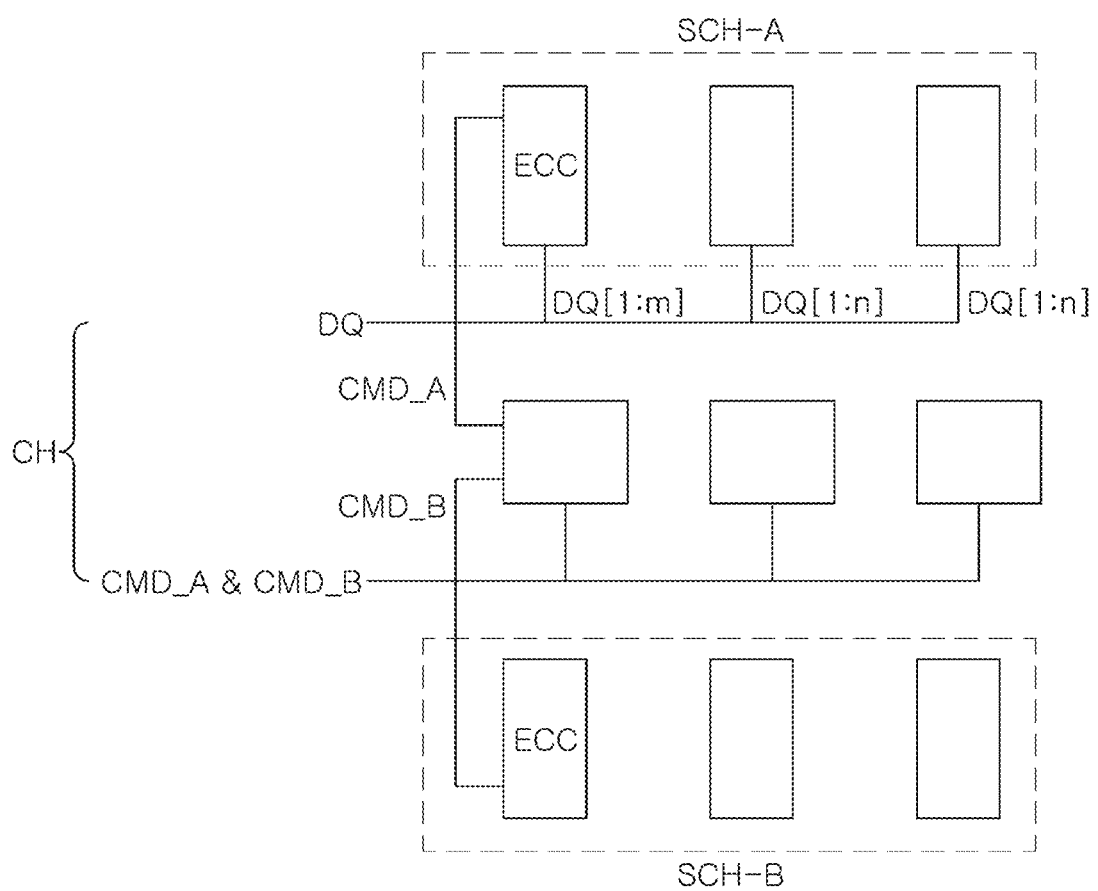
FIG. 4 illustrates a system channel CH according to an exemplary embodiment of the inventive concept.

FIG. 4 illustrates a system channel CH according to an exemplary embodiment of the inventive concept. Referring to FIG. 4, a system channel CH includes a first sub-channel SCH-A and a second sub-channel SCH-B. The first sub-channel SCH-A and the second sub-channel SCH-B may share data lanes DQ and may independently perform channel operations depending on commands (read and write commands) CMD_A and CMD_B.

Figure 5A:
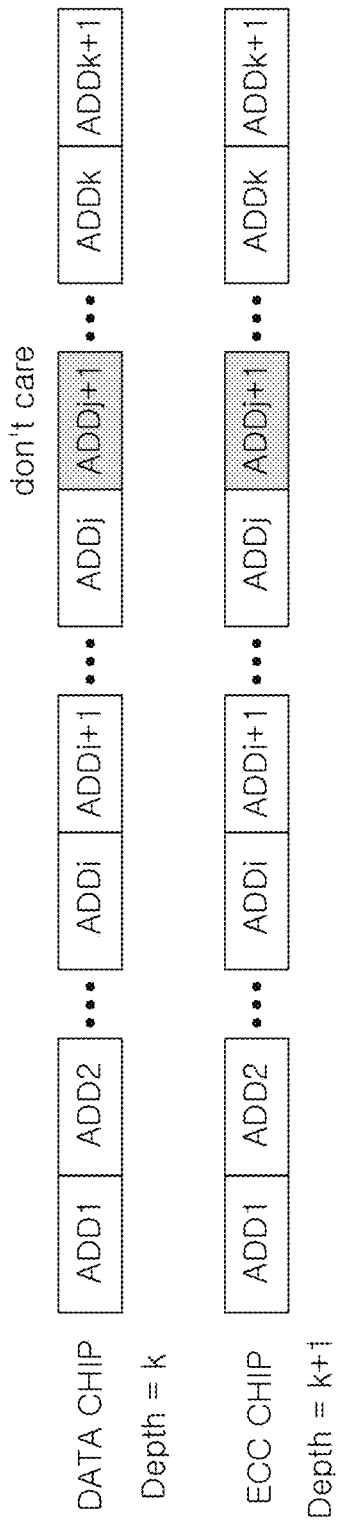
FIG. 5A illustrates an address depth of a memory chip in a memory module 100 according to an exemplary embodiment.

FIG. 5A illustrates an address depth of a memory chip in a memory module 100 according to an exemplary embodiment of the inventive concept, and FIG. 5B illustrates an addressing table of a memory chip housing the memory module 100 according to an exemplary embodiment of the inventive concept.

Referring to FIG. 5A, both a data chip (a first memory chip) and an ECC chip (a second memory chip) receive k+1 address bits ADD1 to ADDk+1 of the address ADD. In general, a chip size (storage capacity) is determined by an input/output width (the number of DQ pins) and an address depth. The term "address depth" refers to the number of address bits (a cycle count) counted (or cared) to determine a chip size. For example, the address depth may refer to the number of address bits considered or the number of address bits that are not ignored.

In an exemplary embodiment of the inventive concept, an address depth of a data chip is less than an address depth of an ECC chip. Although both the data chip and the ECC chip receive the same number of address bits in the memory module 100, the data chip does not count (or does not consider) at least one of the received address bits.

For example, as illustrated in FIG. 5A, the data chip does not count (or does not consider) a single address bit ADDj+1 among the received address bits. For example, the data chip ignores ones of the received address bits. Accordingly, an address depth of the data chip is k, and an address depth of the ECC chip is k+1. For example, the data chip is accessed by k address bits counted, and the ECC chip is accessed by k+1 address bit counted. In an exemplary embodiment, an address includes k+1 address bits, the ECC chip is accessed using first to k+1-th address bits ADD1 to ADDk+1, and the data chip is accessed using first to j-th address bits ADD1 to ADDj and j+2-th to k+1-th address bits ADDj+2 to ADDk+1.

In an exemplary embodiment, the number of bits of an address, counted by the ECC chip, is greater than the number of bits of an address counted by the data chip. For example, the ECC chip considers more bits of the address than the data chip. In an exemplary embodiment, the number of bits of a bank group address, counted by the ECC chip, is greater than the number of bits of a bank group address counted by the data chip. In an exemplary embodiment, the ECC chip considers more bits of a bank group address than the data chip.

FIG. 5B illustrates an address configuration of memory chips constituting storage capacity of 16 Gb. As illustrated in FIG. 5B, an x8 memory chip (a first memory chip) and an x16 memory chip (a first memory chip) are different in presence or absence of a least significant bit BG2 of a bank group address and the number of banks.

In an exemplary embodiment of the inventive concept, each of the first memory chips 111A, 112A, 111B, 112B (see FIG. 3) may be accessed by an addressing table including 2 bits of a bank group address, 2 bits of a bank address, 16 bits of a row address, and 10 bits of a column address, respectively.

In an exemplary embodiment, each of the second memory chips 120A and 120B (see FIG. 3) may be accessed by an addressing table including 3 bits of a bank group address, 2 bits of a bank address, 16 bits of a row address, and a 10 bits of column address.

In an exemplary embodiment, the least significant bit BG2 of the bank group address is activated only in an x8 memory chip. In an exemplary embodiment, the x16 memory chips do not count the least significant bit BG2 of the bank group address. For example, an x16 memory chip may ignore the least significant bit BG2 of the bank group address. The memory system 10 according to an exemplary embodiment secures an x8 ECC lane when the least significant bit BG2 of the bank group is in a low-level during an error correction operation, and secures an x16 ECC lane when the least significant bit GB2 of the bank group transitions from a low-level L to a high-level H during the error correction operation.

Figure 6:
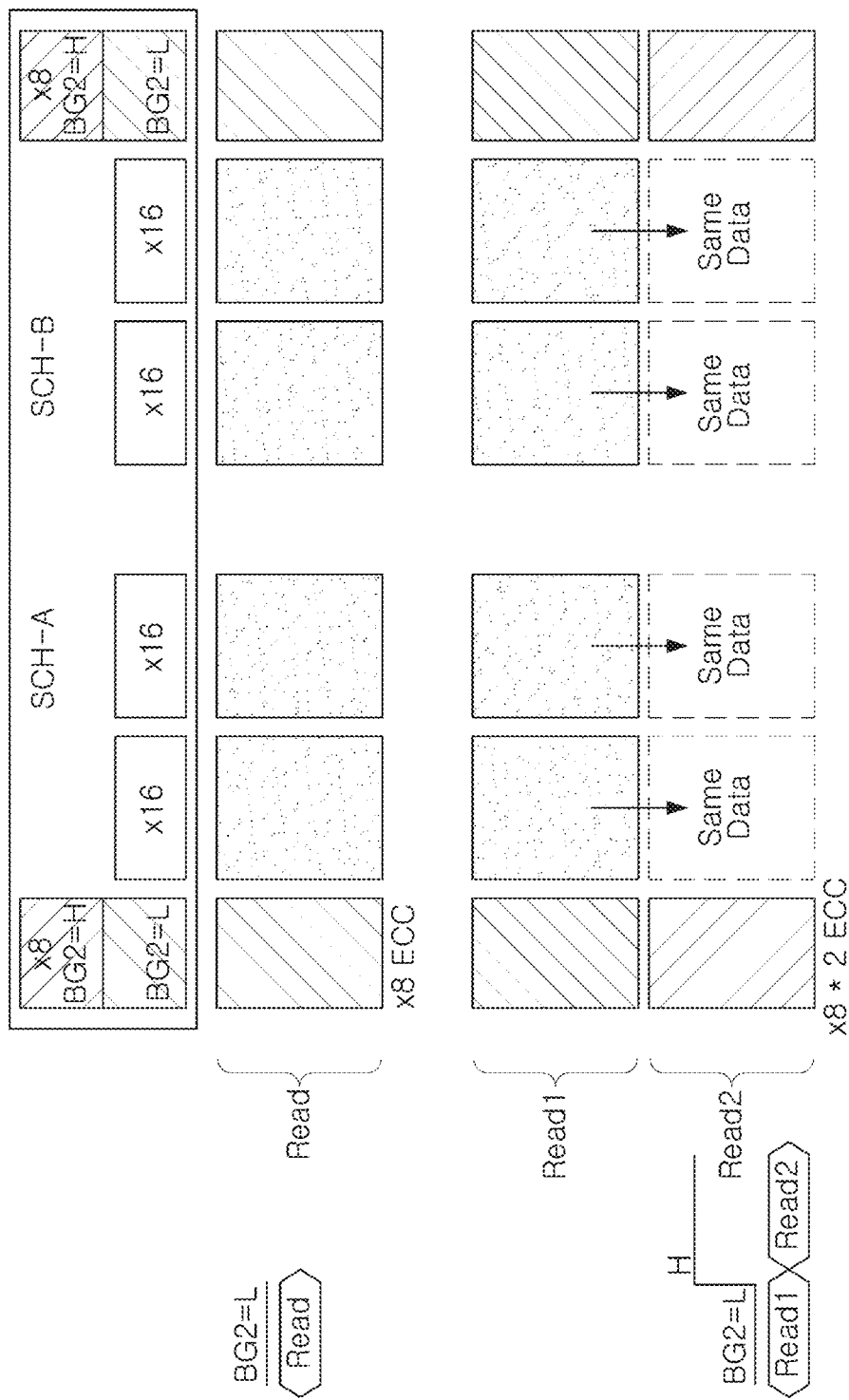
FIG. 6 illustrates a data output of the memory module 100 depending on an error correction mode according to an exemplary embodiment of the inventive concept.

FIG. 6 illustrates a data output of the memory module 100 depending on an error correction mode according to an exemplary embodiment of the inventive concept.

In an exemplary embodiment, when a least significant bit BG2 of a bank group address is in a low-level L, a reading operation depending on a first error correction mode is performed. In the first error correction mode, x8 ECC bits and x16 DATA bits may be output from an x8 memory chip and x16 memory chips in response to a reading command Read, respectively.

When the signal of the least significant bit BG2 of the bank group address is low-level L, x8 ECC bits and x16 DATA bits may be output from the x8 memory chip and the x16 memory chips in response to a first reading command Read1, respectively. In an exemplary embodiment, when the least significant bit BG2 of the bank group address transitions from the low-level L to the high-level H, a reading operation depending on a second error correction mode is performed. In response to a second reading command Read2, x8 ECC bits and x16 DATA bits may be output from the x8 memory chip and the x16 DATA memory chips, respectively. Accordingly, parities of the x16 ECC lane may be output from the x8 memory chip based on the first and second reading commands Read1 and Read2.

In an exemplary embodiment, the x8 memory chip (the second memory chip) may use a defective memory chip (employing a half chip) fixing the least significant bit BG2 of the bank group address to the low-level L or fixing the bank group address BG2 to the high-level H.

The memory module 100 includes heterogeneous first and second memory chips having the same storage capacity (for example, 16 Gb), as illustrated in FIGS. 3 to 6. The first memory chip has an x16 input/output width, and the second memory chip has an x8 input/output width. However, the configuration of the memory module according to embodiments of the present disclosure is not limited thereto. Heterogeneous memory chips, having the same storage capacity, may be configured in various combinations.

Figure 7:
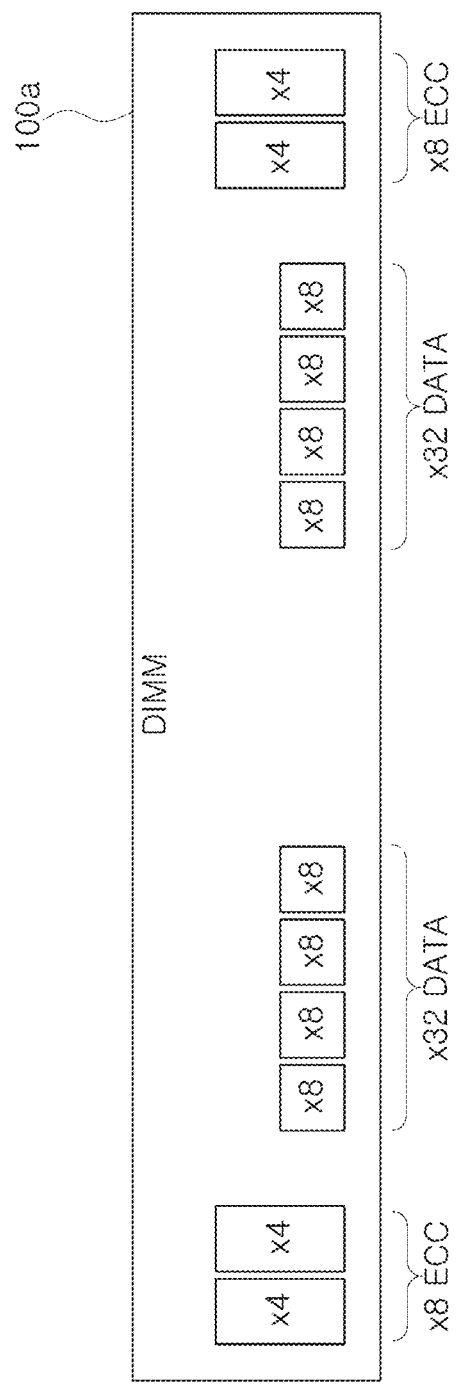
FIG. 7 illustrates a memory module 100a according to an exemplary embodiment of the inventive concept.

FIG. 7 illustrates a memory module 100a according to an exemplary embodiment of the inventive concept. Referring to FIG. 7, each sub-channel of the memory module 100a includes two x4 memory chips for x8 ECC input/output and four x8 memory chips for x32 DATA input/output. For example, the first x8 ECC and first x32 DATA may correspond to a first sub-channel and the second x8 ECC and second x32 DATA may correspond to a second sub-channel.

A memory system according to an exemplary embodiment may be connected between a memory controller and a memory module through a plurality of system channels.

Figure 8:
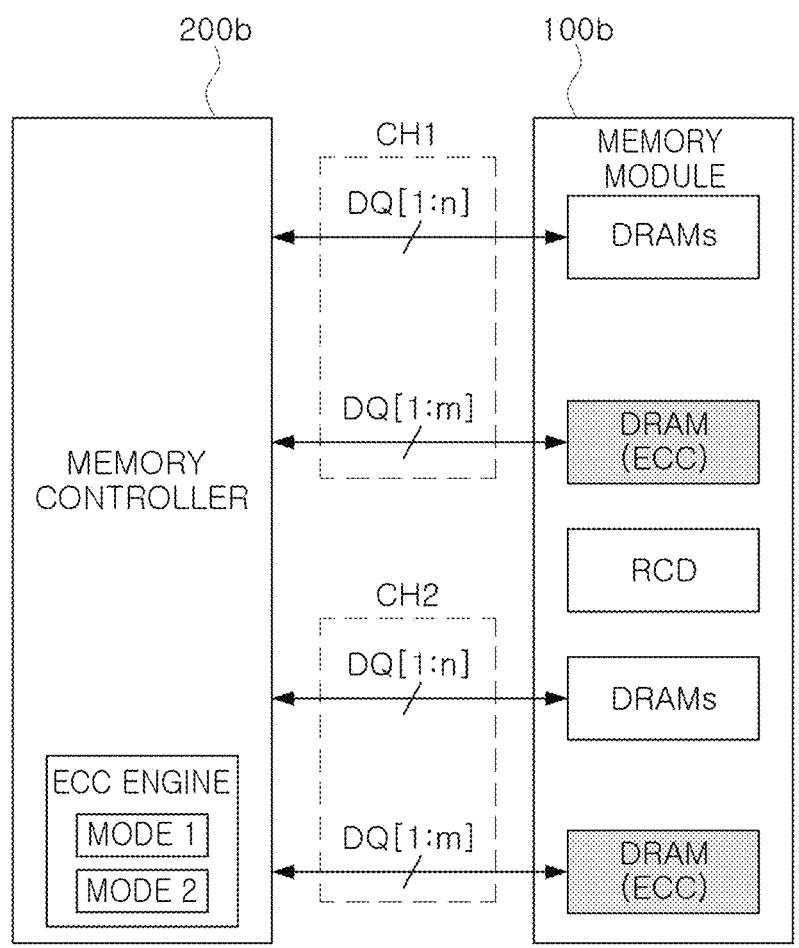
FIG. 8 illustrates a memory system 20 according to an exemplary embodiment of the inventive concept.

FIG. 8 illustrates a memory system 20 according to an exemplary embodiment of the inventive concept. Referring to FIG. 8, the memory system 20 includes a memory module 100b and a memory controller 200b connected by two system channels CH1 and CH2, as compared with the memory system 10 illustrated in FIG. 1. In an exemplary embodiment, each of the system channels CH1 and CH2 includes first memory chips DRAMs storing data, and a second memory chip DRAM (ECC) storing a parity for correcting an error of data. In an exemplary embodiment, each of the first memory chips DRAMs transmit and receive n data signals DQ[1:n], and the second memory chip DRAM (ECC) transmits and receives m data signals DQ[1:m]). For example, the n data signal may correspond to regular data and the m data signals may correspond to parity or ECC data used to correct the regular data.

In an exemplary embodiment, the first memory chip and the second memory chip have the same storage capacity and have different address depths from each other. The address depths of the memory chips may be different per different reliability requirements.

The memory controller 200b may separate controls of bank group addresses of the first memory chip and the second memory chip to extend error correction performance.

In FIGS. 1 to 8, the memory systems extend error correction performance using different address depths in heterogeneous memory chips having the same storage capacity. However, the extension of the error correction performance of the memory systems according to exemplary embodiments is not limited thereto. For example, the extension of the error correction performance may be achieved by varying widths of the ECC input and output lanes.

Figure 9:
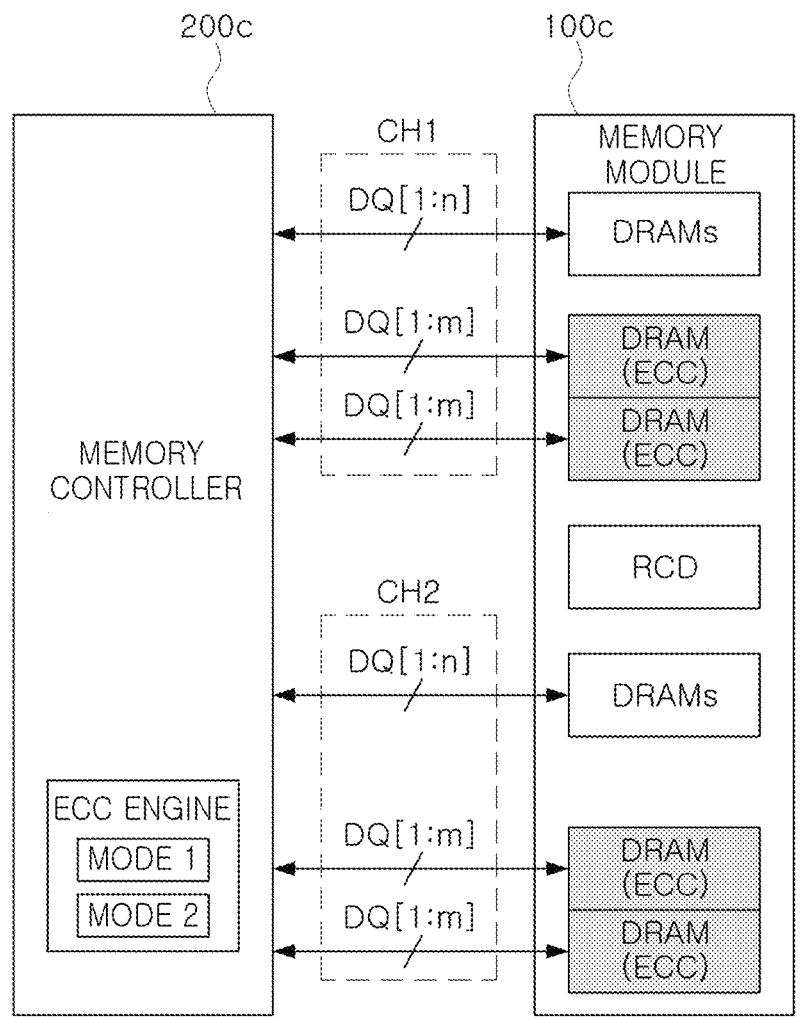
FIG. 9 illustrates a memory system 30 according to an exemplary embodiment of the inventive concept.

FIG. 9 illustrates a memory system 30 according to an exemplary embodiment of the inventive concept. Referring to FIG. 9, the memory system 30 includes two second memory chips DRAM (ECC) for correcting an error in respective system channels CH1 and CH2, as compared with the memory system 20 illustrated in FIG. 8. An ECC engine (e.g., a control circuit) determines whether to receive a parity for error correction through m ECC input/output lanes (first ECC input/output lanes) or a parity for error correction through 2m ECC input/output lanes (first and second ECC input/output lanes) depending on an error correction mode.

A memory controller 200c of the memory module 30 according to an exemplary embodiment is capable of varying widths of ECC input/output lanes for error correction per different performance and reliability requirements.

Figure 10:
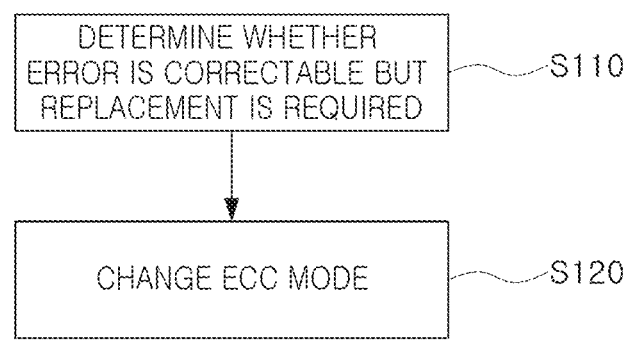
FIG. 10 is a flowchart illustrating an error correction operation of a memory system according to an exemplary embodiment of the inventive concept.

FIG. 10 is a flowchart illustrating an error correction operation of a memory system according to an exemplary embodiment of the inventive concept. Referring to FIGS. 1 to 10, an error correction method may be performed as an operating method of the memory system 10, as follows. The memory controller 200 (see FIG. 1) determines whether an error is correctable and determines whether physical replacement of the memory chip is required when the error is correctable (S110). When the error is correctable and the physical replacement is required, the memory controller 200 changes an ECC mode (S120). For example, the memory controller 200 may operate in a first error correction mode in a normal mode, and may operate in a second error correction mode when the physical replacement is required. The physical replacement refers to replacement of a memory cell, corresponding to an address, with a redundancy cell. For example, if the data with the error that is correctable is stored in a memory cell that has become unreliable, physical replacement may be required. In the second error correction mode, an additional parity is received from an ECC chip having an address depth greater than an address depth of a memory chip.

Figure 11:
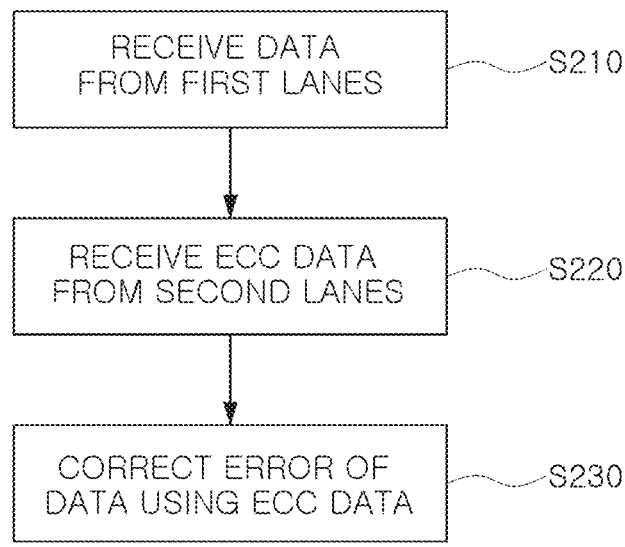
FIG. 11 is a flowchart illustrating a first error correction operation of the memory system 100 according to an exemplary embodiment of the inventive concept.

FIG. 11 is a flowchart illustrating a first error correction operation of the memory system 100 according to an exemplary embodiment of the inventive concept. Referring to FIGS. 1 and 11, the first error correction operation may be performed as follows. The memory controller 200 receives data from the first memory chips 110 through the first lanes (S210). The memory controller 200 receives ECC data (parity) from the second memory chip 120 through the second lanes (S220). The memory controller 200 corrects an error of the received data using the ECC data (S230). For example, the memory controller performs an error correction operation on the received data using the ECC data.

Figure 12:
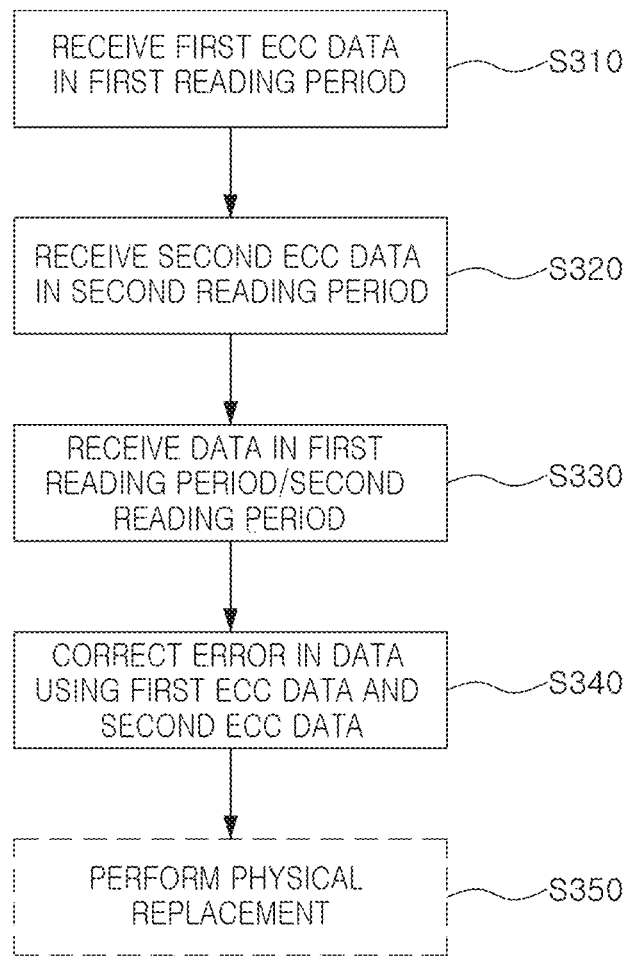
FIG. 12 is a flowchart illustrating a second error correction operation of the memory system 100 according to an exemplary embodiment of the inventive concept.

FIG. 12 is a flowchart illustrating a second error correction operation of the memory system 100 according to an exemplary embodiment of the inventive concept. Referring to FIGS. 1 and 12, the second error correction operation may be performed as follows.

The memory controller 200 receives first ECC data (parity) from the second memory chip 120 through the second lanes in a first reading period (S310). The memory controller 200 receives second ECC data (parity) from the second memory chip 120 through the second lanes in the second reading period (S320). In an exemplary embodiment, the second reading period occurs after the first reading period. The memory controller 200 receives data through the first lanes in the first reading period or the second reading period (S330). The memory controller 200 corrects an error of the received data using the first ECC data and the second ECC data (S340). Accordingly, reliability of data may be secured. Then, the memory controller 200 may optionally control the first memory chip 110 to replace the memory cell, which experienced the second error correction operation, with a redundancy cell (S350).

Figure 13:
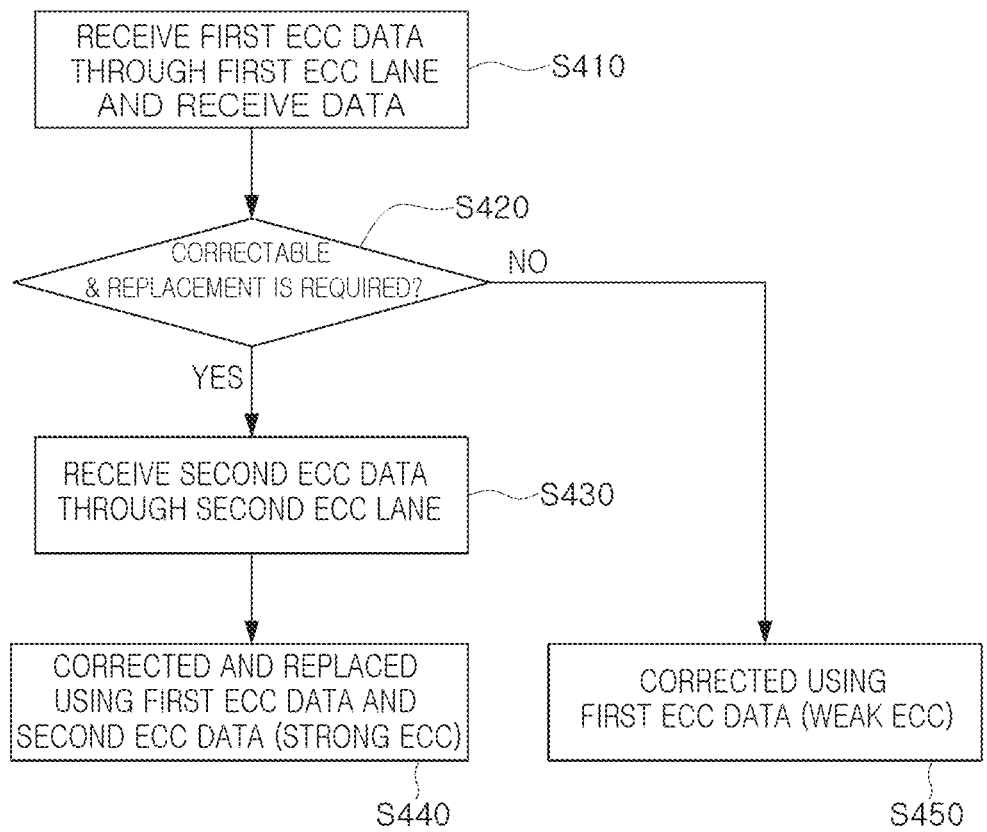
FIG. 13 is a flowchart illustrating an error correction operation of a memory system according to an exemplary embodiment of the inventive concept.

FIG. 13 is a flowchart illustrating an error correction operation of a memory system according to an exemplary embodiment of the inventive concept. Referring to FIGS. 9 and 13, the error correction of the memory system will now be described.

The memory controller 200c receives data from the first memory chips through the data lanes and first ECC data from a second memory chip through first ECC lanes (S410). For example, the memory controller 200c may receive the data from the memory chips represented by the first box of the memory module 100c labelled 'DRAMs' and receive the first ECC data from the memory chip represented by the second box of the memory module 100c labelled 'DRAM (ECC)'. The memory controller 220c determines whether there is an error in the received data, whether the error is correctable when there is an error, and determines whether physical replacement is required for a memory chip when the error is correctable (S420).

When the error is correctable and the physical replacement is required for a memory chip, the memory controller 200c receives second ECC data through the second ECC lanes from the third memory chip (S430). For example, the memory controller 200c may receive the second ECC data from the memory chip represented by the third box of the memory module 100c labelled 'DRAM (ECC)'. In an exemplary embodiment, the physical replacement is determined depending on whether the number of correctable error bits and the number of error bits are greater than a predetermined value. In an exemplary embodiment, physical replacement is required when the number of correctable error bits is greater than the predetermined value.

The memory controller 200c performs an error correction operation on the received data using the first ECC data and the second ECC data and performs physical replacement for the memory chip (Strong ECC) (S440). When the error correction operation is successful, one or more errors of the received data are corrected. For example, after the error is corrected, the memory controller 200c may request the memory chip to replace a memory cell corresponding to an address with a redundancy cell. The memory chip may replace the memory cell corresponding to the address with a redundancy cell according to the request of the memory controller 200c. For example, if the received data is stored in a first memory cell, after an error in the received data is corrected to generate corrected data, the corrected data may be stored in a second other memory cell when replacement is required.

On the other hand, when the error is correctable, but the physical replacement is not required for a memory chip, the memory controller 200c corrects the error of the received data using the first ECC data (Weak ECC) (S450). For example, the memory controller 200c performs an error correction operation on the received data using only the first ECC data when physical replacement is not required.

The above-described embodiments may be implemented using hardware components, software components, and/or a combination thereof. For example, the method and the components described in the embodiments may be implemented using one or more general-purpose or special purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner.

Figure 14:
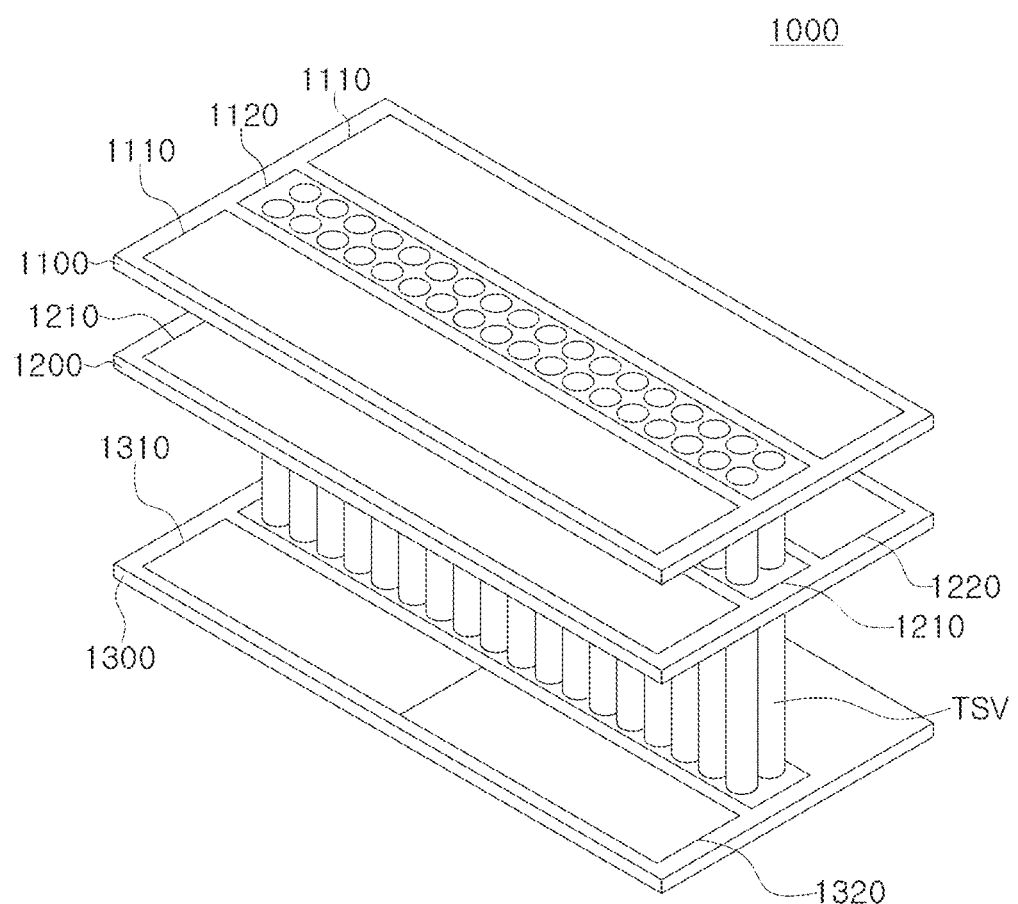
FIG. 14 is a block diagram of a memory chip according to an exemplary embodiment of the inventive concept.

A memory chip of the present disclosure may be implemented in a stacking configuration FIG. 14 is a block diagram of a memory chip according to an exemplary embodiment of the inventive concept.

Referring to FIG. 14, a memory chip 1000 includes first to third memory dies 1100 to 1300 and through-silicon vias (TSVs) stacked on a substrate in a vertical direction. The number of the stacked memory dies is not limited to that illustrated in FIG. 14. For example, first and second memory dies 1100 and 1200 may be slave dies, and the third memory die 1300 may be a master die or a buffer die.

The first memory die 1100 includes a first memory cell array 1110 and a first through-electrode region 1120 for access to the first memory cell array 1110. The second memory die 1200 includes a second memory cell array 1210 and a second through-electrode region 1220 for access to the second memory cell array 1210. The first through-electrode region 1120 may represent a region in which through-electrodes for communication between the first memory die 1100 and the third memory die 1300 are disposed in the first memory die 1100. Similarly, the second through-electrode region 1220 may represent a region in which through-electrodes for communication between the second memory die 1200 and the third memory die 1300 are disposed in the second memory die 1200. The through-electrodes may provide electrical paths between the first to third memory dies 1100 to 1300. The first to third memory dies 1100 to 1300 may be electrically connected to each other by the through-electrodes. For example, hundreds to thousands of the through-electrodes may be provided, and the through-electrodes may be arranged in a matrix form. The third memory die 1300 includes a first peripheral circuit 1310 and a second peripheral circuit 1320. The first peripheral circuit 1310 may include circuits for accessing the first memory die 1100, and the second peripheral circuit 1320 includes circuits for accessing the second memory die 1200.

A memory chip according to an exemplary embodiment of the present disclosure has a variable input/output width depending on control of a memory controller.

Figure 15:
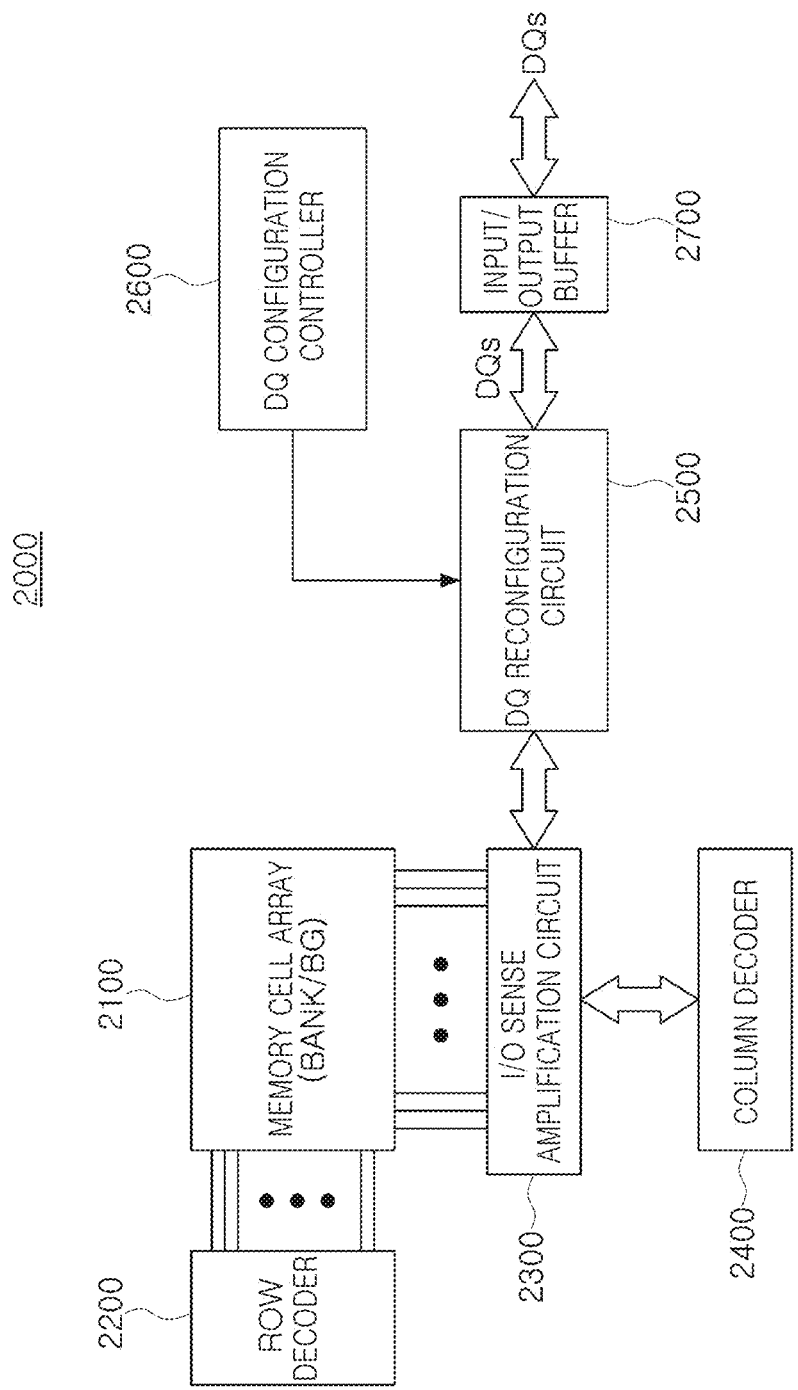
FIG. 15 illustrates a memory chip 2000 according to an exemplary embodiment of the inventive concept.

FIG. 15 illustrates a memory chip 2000 according to an exemplary embodiment of the inventive concept. Referring to FIG. 15, the memory chip 2000 includes a memory cell array 2100, a row decoder 2200 (e.g., a decoder circuit), an input/output sense amplification circuit 2300, a column decoder 2400 (e.g., a decoder circuit), a DQ reconfiguration circuit 2500, and a DQ configuration controller 2600 (e.g., control circuit), and an input/output buffer 2700.

The DQ reconfiguration controller 2600 may generate a control signal based on a user command. The control signal may be provided to the DQ reconfiguration circuit 2500 to change a mode of a DQ configuration, for example, a DQ pad to a desired mode in an on-the-fly manner (e.g., dynamically). The user command may include a command to configure the DQ pad in a mode desired by the user, among the x4, x8, and x16 DQ pad modes. Such a user command may be transmitted while a memory device including the memory chip 2000 is being operated. When the control signal is provided to the DQ reconfiguration circuit 2500, the DQ reconfiguration circuit 2500 may reconfigure the DQ pad configuration in an on-the-fly manner, for example, in a DQ pad mode designated by the control signal.

In an exemplary embodiment, the user command is a command provided from a memory controller of the processor. When a use plan or schedule related to the DQ pad mode of the memory device is included as a portion of a predetermined program and the program is executed through the processor, the memory controller instructed by the processor may transmit an instruction to the DQ configuration controller 200 for switching the DQ pad mode of the memory device. The DQ reconfiguration circuit 2500 may reconfigure the configuration of the DQ pad in an instructed mode, based on the control signal provided from the DQ configuration controller 2600. For example, when the control signal provided from the DQ configuration controller 2600 is a signal for switching to an x8 mode, the configuration of the DQ pad may be immediately changed to the x8 mode.

The memory chip 2000 includes a memory cell array 2100, including memory cells and support logic used to write data to the memory cell array 210 or to read data from the memory cell array 2100. In an exemplary embodiment, the memory cell array 2100 is disposed in rows (or wordlines) and columns (or bitlines) of memory cells. Each memory cell in the memory cell array 2100 has a unique location, for example, an address defined by the intersection of rows and columns. The support logic may latch the row and column addresses of the memory cell array 210. The support logic includes a row decoder 2200, an input/output sense and amplifier 2300, a column decoder 2400, and an input/output buffer 2700. The row decoder 2200 and the column decoder 2400 may be configured to resolve addresses and to control the start and end of a reading operation and a writing operation. The input/output sense and amplifier 2300 may be configured to amplify an input/output signal of data lines. The input/output buffer 2700 may be configured to buffer input/output data. For example, data may be temporarily stored in the input/output buffer 2700 before it is output.

The memory chip 2000 according to an exemplary embodiment may implement a configuration of the two ECC memory chips, illustrated in FIG. 9, as a single memory chip.

Figure 16:
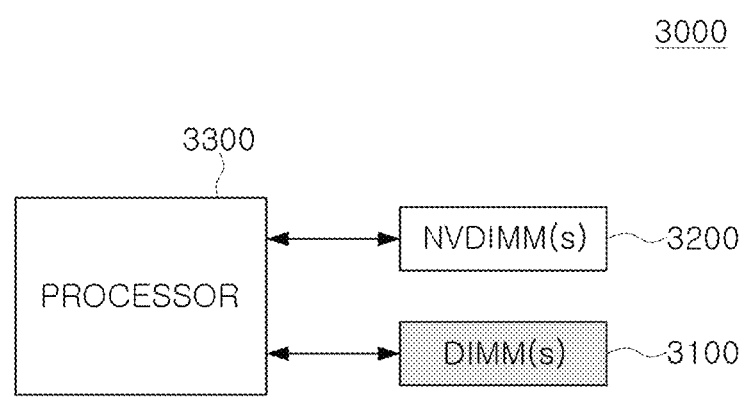
FIG. 16 illustrates a computing system 3000 according to an exemplary embodiment of the inventive concept.

FIG. 16 illustrates a computing system 3000 according to an exemplary embodiment of the inventive concept. Referring to FIG. 16, the computing system 3000 includes at least one memory module (DIMM) 3100, at least one nonvolatile memory module (NVDIMM) 3200, and at least one processor 3300.

In an exemplary embodiment, the computing system 3000 may be used as one of a plurality of devices such as a computer, a portable computer, an ultra-mobile personal computer (UMPC), a workstation, a data server, a net-book, a personal data assistant (PDA), a web tablet, a wireless phone, a mobile phone, a smart phone, an e-book, a portable multimedia player (PMP), a digital camera, a digital audio recorder/player, a digital picture/video recorder/player, a portable game machine, a navigation system, a black box, a 3D television, a device capable of transmitting and receiving information in a wireless manner, a wearable device, one of various electronics devices constituting a home network, one of various electronics devices constituting a computer network, one of various electronics devices constituting a telematics network, a radio-frequency identification (RFID) device, or one of various electronic devices constituting a computing system.

The at least one memory module 3100 may be implemented with the memory module or the error correction operation described with reference to FIGS. 1 to 15. In an exemplary embodiment, the memory module 3100 is connected to the processor 3300 according to a DDRx interface.

In an exemplary embodiment, the at least one memory module 3100 includes at least one first memory chip (data chip), having a first input/output width and storing data, and at least one second memory chip (ECC chip) having a second input/output width, different from the first input/output width, and storing an error correction code for correcting an error in the data.

The at least one nonvolatile memory module 3200 may include at least one nonvolatile memory. In an exemplary embodiment, the at least one nonvolatile memory may include a NAND flash memory, a vertical NAND flash memory (VNAND), a NOR flash memory, a resistive random access memory (RRAM), a phase-change memory (PRAM), a magneto-resistive random access memory (MRAM), a ferroelectric random access memory (FRAM), a spin transfer toque random access memory (STT-RAM), a thyristor random access memory (TRAM), or the like. In an exemplary embodiment, the nonvolatile memory module 3200 is connected to the processor 3300 according to a DDR interface.

The at least one processor 3300 may be implemented to control the memory module 3100 and the nonvolatile memory module 3200. In an exemplary embodiment, the processor 3300 may include a general purpose microprocessor, a multicore processor, a digital signal processor (DSP), an application specific integrated circuit (ASIC), or a combination thereof.

In an example embodiment, the processor 3300 may distinguish an address depth of at least one first memory chip of the memory module 3100 and an address depth of at least one second memory chip of the memory module 3100 from each other.

In an exemplary embodiment, the processor 3300 varies the second input/output width of the at least one second memory chip of the memory module 3100 depending on performance and reliability requirements.

In an exemplary embodiment, the above-described memory module is provided in a data server.

Figure 17:
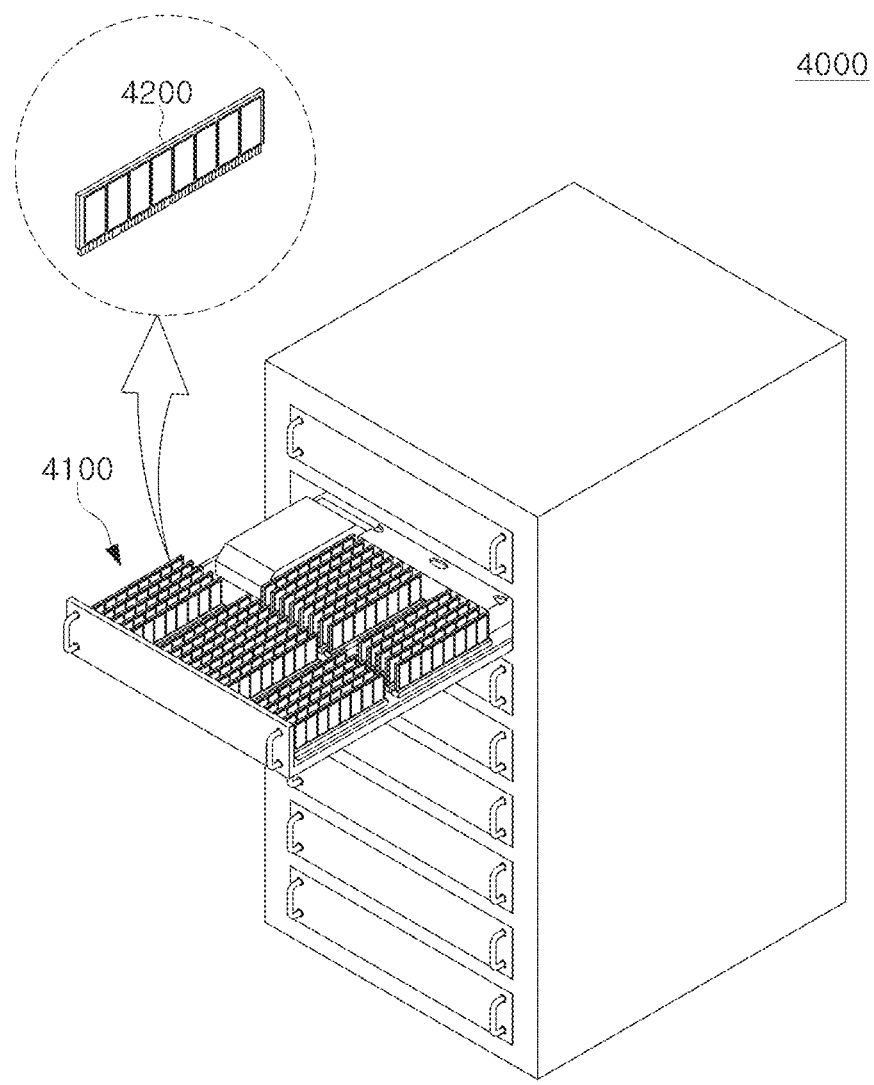
FIG. 17 illustrates a server device 4000 according to an exemplary embodiment of the inventive concept.

FIG. 17 illustrates a server device 4000 (e.g., a data server) according to an exemplary embodiment of the inventive concept. Referring to FIG. 17, the server device 4000 includes a plurality of racks 4100. The memory module 4200, described with reference to FIGS. 1 through 16, may be mounted in each of the plurality of racks 4100.

In an exemplary embodiment, each of the racks 4100 may include main memory devices, at least one processor, at least one chipset, and at least one storage device mounted thereon. In an exemplary embodiment, the server device 4000 may be additionally provided with an input/output device, a graphics processor, and a display device.

A server module may be configured based on an x4 DRAM or an x8 DRAM. In a common server module, the entire DRAM is implemented in the same configuration (input and output width), and relief for x4 to x8 data lanes is performed through a system ECC. A server module for a next-generation DDR5 according to an exemplary embodiment of the inventive concept include two sub-channels. In each of the sub-channels, x32 data and x8 ECC may be input and output. The memory module according to this embodiment may include a DDR5 server-oriented memory module, in which x16 DRAM and x8 DRAM are mixed with each other, to configure a server-oriented DIMM and to implement improved ECC coverage, as compared with an existing module.

As described above, according to an exemplary embodiment of the inventive concept, address depths of a memory chip and an error correction chip are separated from each other to extend an error correction range without degradation in performance.

While exemplary embodiments have been shown and described above, it will be apparent to those skilled in the art that various modifications can be made without departing from the scope of the present inventive concept.

What is claimed is:

1. A memory module comprising:
   a plurality of first memory chips configured to store data, where each first memory chip has a first input/output width;
   a second memory chip configured to store an error correction code (ECC) for correcting an error in the data, the second memory chip having a second input/output width; and
   a driver circuit configured to receive a clock signal, a command, and an address from a memory controller and to transmit the clock signal, the command, and the address to the first memory chips and the second memory chip,
   wherein an address depth of each of the first memory chips and an address depth of the second memory chip are different from each other.

2. The memory module of claim 1, wherein the first input/output width is greater than the second input/output width.

3. The memory module of claim 1, wherein the first input/output width is an x16 bit interface, and the second input/output width is an x8 bit interface.

4. The memory module of claim 1, wherein a storage capacity of each of the first memory chips and a storage capacity of the second memory chip are the same.

5. The memory module of claim 1, wherein an address depth of each of the first memory chips is less than an address depth of the second memory chip.

6. The memory module of claim 5, wherein each of the first memory chips and the second memory chip are accessed by the address including 3 bits of a bank group address, 2 bits of a bank address, 16 bits of a row address, and 10 bits of a column address, and
   each of the first memory chips ignore at least one address bit in the address.

7. The memory module of claim 6, wherein the at least one address bit is a least significant bit of the bank group address.

8. The memory module of claim 1, wherein the first memory chips input and output data of an x32 bit interface, and
the second memory chip inputs and outputs an error correction code of an x8 bit interface.

9. The memory module of claim 8, wherein the address includes a bank group address, a bank address, a row address, and a column address, and
when a least significant bit of the bank group address is at a low-level, 32 bits of data is output from the first memory chips in response to a read command and 8 bits of data is output from the second memory chip in response to the read command.

10. The memory module of claim 8, wherein the address includes a bank group address, a bank address, a row address, and a column address,
when a least significant bit of the bank group address is in a low-level, 32 bits of data is output from the first memory chips in response to a first read command and 8 bits of error correction code is output from the second memory chip in response to the first read command, and
when the least significant bit of the bank group address transitions from the low-level to a high-level, the 32 bits of data are output from the first memory chips in response to a second read command and the 8 bits of error correction code are output from the second memory chip in response to a second read command.

11. The memory module of claim 1, wherein an input/output width of each of the first memory chips and the second memory chip is varied by the memory controller.

12. The memory module of claim 1, wherein each of the first memory chips is a data chip, and
the second memory chip is an ECC chip.

13. The memory module of claim 12, wherein the number of bits of an address, considered by the ECC chip, is greater than the number of bits of an address considered by the data chip.

14. The memory module of claim 12, wherein the data chip is accessed by banks according to 2 bits of a bank group address, and
the ECC chip is accessed by banks according to 3 bits of bank group address.

15. The memory module of claim 12, wherein the address includes k+1 address bits,
the ECC chip is accessed using first to k+1-th address bits, and
the data chip is accessed using first to j-th address bits and j+2-th to k+1-th address bits, where j and k are natural numbers.

16. A memory module comprising:
a first sub-channel;
a second sub-channel; and
a driver circuit configured to receive a clock signal, first and second commands, and an address from a memory controller and to transmit the clock signal, the first command, and the address to the first sub-channel and transmit the clock signal, the second command, and the address to the second sub-channel,
wherein each of the first and second sub-channels comprises:
a plurality of first memory chips configured to store data, each first memory chip having a first input/output width; and
a second memory chip configured to store an error correction code for correcting an error in the data, the second memory chip having a second input/output width, less than the first input/output width, and
an address depth of each of the first memory chips and an address depth of the second memory chip are different from each other.

17. The memory module of claim 16, wherein each of the first and second sub-channels inputs and outputs data of an x32 bit interface and inputs and outputs an error correction code of an x8 bit interface.

18. The memory module of claim 16, wherein the second memory chip uses a defective memory chip fixing a least significant bit of a bank group address to a low-level or fixing the least significant bit of the bank group address to a high-level.

19. The memory module of claim 18, wherein each of the first memory chips outputs data, irrespective of the least significant bit of the bank group address, and
the second memory chip outputs an additional error correction code for correcting an error in the data in response the least significant bit of the bank group.

* * * * *